(12) United States Patent
Filisko et al.

(10) Patent No.: US 9,902,819 B2
(45) Date of Patent: Feb. 27, 2018

(54) DISPERSION METHOD FOR PARTICLES IN NANOCOMPOSITES AND METHOD OF FORMING NANOCOMPOSITES

(75) Inventors: Frank Filisko, Ann Arbor, MI (US); Kaajal Raj Juggernauth, Ann Arbor, MI (US); Anthony Waas, Ann Arbor, MI (US); Doris Filisko, legal representative, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 1005 days.

(21) Appl. No.: 12/558,941

(22) Filed: Sep. 14, 2009

(65) Prior Publication Data
US 2011/0064940 A1 Mar. 17, 2011

(51) Int. Cl.
B29C 47/00 (2006.01)
B29C 55/00 (2006.01)
(Continued)

(52) U.S. Cl.
CPC .............. C08J 5/005 (2013.01); B29B 7/08 (2013.01); B29B 7/106 (2013.01); B29B 7/90 (2013.01);
(Continued)

(58) Field of Classification Search
CPC ........ B29C 55/005; B82Y 30/00; C08J 5/005; B29B 9/06; B29B 9/12
See application file for complete search history.

(56) References Cited

U.S. PATENT DOCUMENTS 2,345,533 A * 3/1944 De Witt Graves ...... C08J 3/203
106/287.3
2,951,821 A * 9/1960 Kesling .................... C08K 3/04
523/220

(Continued)

FOREIGN PATENT DOCUMENTS

GB 979305 A * 1/1965 ............. B29B 7/002
GB 2343389 A * 5/2000
(Continued)

OTHER PUBLICATIONS

Particle Sizes, The Engineering ToolBox, www.EngineeringToolBox.com, pp. 1-2, Jul. 2014.*
(Continued)

*Primary Examiner* — Monique Jackson
(74) *Attorney, Agent, or Firm* — Harness, Dickey & Pierce, P.L.C.

(57) ABSTRACT

A method of manufacturing a nanocomposite includes exposing dry nanoparticles to a dry, solid matrix material or pellets in a container to form a combination which is then agitated by rotating about an axis transverse to a direction of gravity, at room temperature and without grinding objects, to cause a tumbling action between the pellets and the nanoparticles to thereby evenly disperse and coat the nanoparticles directly on outer surfaces of the pellets which remain in a solid phase and of the same size throughout rotating. The method also includes processing the resulting combination, particularly polypropylene pellets and carbon black nanoparticles, by heating to form a viscous combination which is then drawn to form a nanocomposite fiber having carbon black nanoparticles dispersed evenly throughout the polypropylene, with a resulting fiber having a diameter of 30 µm-100 µm and tensile strength of 300-1500% greater than
(Continued)

a similar polypropylene fiber produced without the nanoparticles.

4 Claims, 4 Drawing Sheets

(51) Int. Cl.
| | |
|---|---|
| B29B 7/08 | (2006.01) |
| B29B 9/06 | (2006.01) |
| B29B 9/12 | (2006.01) |
| C08J 5/00 | (2006.01) |
| C08K 3/04 | (2006.01) |
| B29B 7/10 | (2006.01) |
| B29B 7/90 | (2006.01) |
| B29B 9/14 | (2006.01) |
| B29C 45/00 | (2006.01) |
| B29C 47/54 | (2006.01) |
| B29C 47/88 | (2006.01) |
| B01F 9/00 | (2006.01) |
| B29B 9/16 | (2006.01) |
| B29C 47/82 | (2006.01) |
| B29K 105/16 | (2006.01) |
| B29L 31/00 | (2006.01) |

(52) U.S. Cl.
CPC .......... B29B 9/06 (2013.01); B29B 9/12 (2013.01); B29B 9/14 (2013.01); B29C 45/0013 (2013.01); B29C 47/0014 (2013.01); B29C 47/54 (2013.01); B29C 47/822 (2013.01); B29C 47/8805 (2013.01); B29C 55/005 (2013.01); C08K 3/04 (2013.01); B01F 2009/0059 (2013.01); B29B 2009/163 (2013.01); B29C 47/82 (2013.01); B29K 2105/167 (2013.01); B29L 2031/731 (2013.01); C08J 2323/12 (2013.01); C08K 2201/005 (2013.01); Y10T 428/25 (2015.01)

(56) References Cited

U.S. PATENT DOCUMENTS

| | | | | |
|---|---|---|---|---|
| 3,035,003 | A * | 5/1962 | Kessler | 427/214 |
| 3,067,118 | A * | 12/1962 | Harper et al. | 522/157 |
| 3,226,244 | A * | 12/1965 | Jordan | C09C 1/56 |
| | | | | 106/478 |
| 3,485,782 | A * | 12/1969 | Nagle | 524/274 |
| 3,528,841 | A * | 9/1970 | Donaldson et al. | 427/222 |
| RE28,361 | E * | 3/1975 | Hahn | 428/407 |
| 4,906,428 | A * | 3/1990 | Kelly | 264/310 |
| 4,915,987 | A * | 4/1990 | Nara et al. | 427/180 |
| 5,415,354 | A | 5/1995 | Shutov et al. | |
| 7,935,276 | B2 * | 5/2011 | Zhou et al. | 252/511 |
| 2006/0121270 | A1 * | 6/2006 | Kazeto | 428/327 |
| 2006/0186384 | A1 * | 8/2006 | Gerhardt et al. | 252/511 |
| 2007/0218280 | A1 * | 9/2007 | Yabuki | D01F 1/10 |
| | | | | 428/366 |
| 2007/0276077 | A1 * | 11/2007 | Mao | B82Y 30/00 |
| | | | | 524/445 |
| 2008/0187657 | A1 * | 8/2008 | Altan | B05D 1/12 |
| | | | | 427/180 |
| 2009/0198032 | A1 | 8/2009 | Torkelson et al. | |

FOREIGN PATENT DOCUMENTS

| | | | | |
|---|---|---|---|---|
| JP | | 57011017 A * | 1/1982 | |
| WO | WO 0069958 | A1 * | 11/2000 | B29C 55/00 |
| WO | WO 2010104710 | A1 * | 9/2010 | B82Y 30/00 |

OTHER PUBLICATIONS

Naked Eye, Wikipedia, the free encyclopedia, http://en.wikipedia.org, p. 3, Jul. 2014.*
Wypych, Handbook of Fillers, 2nd Edition, ChemTec Publishing, 2000, pp. 241-297, 305-343, 395-455, 749-774.*
Coleman, Small but strong: A review of the mechanical properties of carbon nanotube-polymer composites, Carbon, vol. 44 (2006), pp. 1624-1652.*
Ultimate tensile strength, Wikipedia, the free encyclopedia, https://en.wikipedia.org/wiki/Ultimate_tensile_strength, printed Mar. 15, 2016.*
Machine translation of JP57011017A published Jan. 1982.*
Dickey, Mixing and Blending, 2010, Kirk-Othmer Encyclopedia of Chemical Technology, pp. 1-2 and 62-68.*
Al-Saleh, M. H. et al., "Nanostructured carbon black filled polypropylene/polystyrene blends containing styrene-butadiene-styrene copolymer: Influence of morphology on electrical resistivity;" European Polymer Journal 44 (2008), pp. 1931-1939; journal homepage: www.elsevier.com/locate/europolj.
Andrews, R. et al., "Fabrication of Carbon Multiwall Nanotube/Polymer Composites by Shear Mixing," Macromol. Mater. Eng. (2002) 6, pp. 287, 395-403.
Chen, G. et al., "FTIR Spectra, Thermal Properties, and Dispersibility of a Polystyrene/Montmorillonite Nanocomposite;" Macromol. Chem. Phys. (2001) 202, pp. 1189-1193.
Gelfer, M. Y. et al., "Effects of Organoclays on Morphology and Thermal and Rheological Properties of Polystyrene and Poly(methyl methacrylate) Blends;" Journal of Polymer Science Part B: Polymer Physics (2003) vol. 41, pp. 44-54.
Hussain, F. et al., "Review article: Polymer-matrix Nanocomposites, Processing, Manufacturing, and Application: An Overview;" Journal of Composite Materials (2006), 40; 1511; http://jcm.sagepub.com/cgi/content/abstract/40/17/1511.
Hwang, J. et al., "Electrical and Mechanical Properties of Carbon-Black-Filled, Electrospun Nanocomposite Fiber Webs;" Journal of Applied Polymer Science (2007), vol. 104, pp. 2410-2417.
Juggernauth, K. et al., "Polymer Nanocomposites: Solvent-Free Processing Towards Improved Mechanical and Thermal Properties at Ultra-Low Filler Loading;" Proceedings of the Polymer Materials Science and Engineering (PMSE) Division, 237th ACS National Meeting (Mar. 2009), Salt Lake City, UT.
Krishnamoorti, R., "Strategies for Dispersing Nanoparticles in Polymers;" MRS Bulletin (Apr. 2007), vol. 32; www.mrs.org/bulletin.
Lebovitz, A. H. et al., "Sub-micron dispersed-phase particle size in polymer blends: overcoming the Taylor limit via solid-state shear pulverization;" Polymer 44 (2003), pp. 199-206; www.elsevier.com/locate/polymer.
Mamedov, A. A. et al., "Molecular design of strong single-wall carbon nanotube/polyelectrolyte multilayer composites;" Nature Materials (Nov. 2002), vol. 1, pp. 190-194; www.nature.com/naturematerials.
Mlynarčiková, Z. et al., "Syndiotactic poly(propylene)/organoclay nanocomposite fibers: influence of the nano-filler and the compatibilizer on the fiber properties;" Polym. Adv. Technol. (2005) 16, pp. 362-369; www.interscience.wiley.com).
Moniruzzaman, M. et al., "Polymer Nanocomposites Containing Carbon Nanotubes;" Macromolecules (2006) 39, pp. 5194-5205.
Polymer Nanocomposite Fibers at Ultra-Low Filler Concentration, presented at ACS National Conference—Spring Conference (Apr. 2009), Salt Lake City, UT.
Processing and characterization of Nano-Composites, presented at Internal Macromolecular Science & Research Center Symposium (Oct. 2006) University of Michigan.
Processing and characterization of Nano-Composites, presented at Polymer Innovation Northeast Conference (Jun. 2007) Case Western University, Cleveland, OH.
Qin, S. et al., "Covalent Cross-linked Polymer/Single-wall carbon nanotube multilayer films;" Chemistry of Materials (2005) 17, pp. 2131-2135.
Sainz, R. et al., "Synthesis and properties of optically active polyaniline carbon nanotube composites;" Macromolecules (2006) 39, pp. 7324-7332.
Schmidt, D. et al., "New advances in polymer/layered silicate nanocomposites;" Current Opinion in Solid State and Materials Science (2002) 6, pp. 205-212.

(56) References Cited

OTHER PUBLICATIONS

Shim, B.S. et al., "Multilayer composites from vapor-grown carbon nano-fibers;" Composites Science and Technology (2006) 66, pp. 1174-1181.

Sinha Ray, S.& Okamoto, M., "Polymer/ layered silicate nanocomposites: a review from preparation to processing;" Progress in Polymer Science (2003) 28, pp. 1539-1641.

Stankovich, S. et al.,"Graphene-based composite materials;" Nature (2006) 442, pp. 282-286.

Tabuani, D. et al., "Polypropylene based carbon nanotubes composites: structure and properties;" E-Polymers (2008), Paper No. 103.

Wakabayashi, K. et al., "Polymer-Graphite Nanocomposites: Effective Dispersion and Major Property Enhancement via Solid-State Shear Pulverization;" Macromolecules (2008) 41, 6, pp. 1905-1908.

Walker, A.M. et al., "Polyethylene/starch blends with enhanced oxygen barrier and mechanical properties: Effect of granule morphology damage by solid-state shear pulverization;" Polymer (2007) 48, 4, pp. 1066-1074.

Winey, K.I. et al., "Polymer Nanocomposites;" MRS Bulletin (2007) 32, pp. 314-319.

\* cited by examiner

US 9,902,819 B2

DISPERSION METHOD FOR PARTICLES IN NANOCOMPOSITES AND METHOD OF FORMING NANOCOMPOSITES

FIELD

The present disclosure relates to nanocomposites and, more particularly, relates to a dispersion method for particles in nanocomposites and a method of forming nanocomposites.

BACKGROUND

The statements in this section merely provide background information related to the present disclosure and may not constitute prior art.

Nanocomposites are materials that include nanoparticles (e.g., microscopic particles with at least one dimension less than 100 nm) dispersed in and distributed through a matrix material. Nanocomposites can exhibit enhanced properties due to the nanoparticles contained therein. For example, a nanocomposite with nanoparticles in a matrix material can exhibit mechanical strength and stiffness that is significantly higher than the matrix material alone. Other properties may be enhanced as well, such as electrical properties, dielectric properties, thermal stability, optical properties, magnetic properties, and/or acoustic properties.

In order for the nanoparticles to substantially enhance the properties of the nanocomposite, the nanoparticles should be distributed through the matrix material evenly. However, in conventional nanocomposite manufacturing, nanoparticles tend to conglomerate and cluster together such that the nanoparticles are less likely to disperse evenly through the matrix material. As such, the properties of the matrix material may not be enhanced significantly.

Thus, a method of manufacturing a nanocomposite is disclosed below wherein nanoparticles can be more evenly dispersed through a matrix material. The method can be convenient, effective, and can be completed at relatively low costs with conventional equipment. Moreover, the method can be adapted in various ways according to the desired properties of the nanocomposite, according to the amount of nanocomposite to be produced, and the like. Furthermore, the nanocomposite produced according to this method can exhibit greatly enhanced properties using relatively small concentrations of nanoparticles.

SUMMARY

A method of manufacturing a nanocomposite is disclosed that includes exposing a plurality of substantially dry nanoparticles to a substantially dry and solid matrix material to form a combination of the nanoparticles and the matrix material. The method also includes agitating the combination of the nanoparticles and the matrix material to thereby disperse the nanoparticles on the matrix material. The matrix material remains in a solid phase during agitating. Furthermore, the method includes processing the combination to form the nanocomposite having the nanoparticles dispersed in the matrix material.

A nanocomposite material formed according to a process is also disclosed. The process includes exposing a plurality of substantially dry nanoparticles to a substantially dry and solid matrix material to form a combination of the nanoparticles and the matrix material. The process also includes agitating the combination of the nanoparticles and the matrix material to thereby disperse the nanoparticles on the matrix material. The matrix material remains in a solid phase during agitating. Moreover, the process includes processing the combination to form the nanocomposite having the nanoparticles dispersed in the matrix material.

Still further, a method of manufacturing a nanocomposite is disclosed that includes substantially drying a matrix material. The matrix material includes solid polypropylene pellets, and the pellets each include an outer surface. The method also includes exposing a plurality of substantially dry nanoparticles of carbon black to the matrix material to form a combination of the nanoparticles and the matrix material. Furthermore, the method includes rotating the combination for approximately 24 hours at room temperature about an axis that is transverse to a direction of gravity to thereby disperse the nanoparticles substantially evenly on the outer surfaces of the pellets of matrix material. Also, the method includes heating the combination so that the nanoparticles are dispersed in the matrix material that is viscous. Additionally, the method includes drawing the combination to form a fiber of the nanocomposite having the nanoparticles dispersed substantially evenly throughout the fiber. The nanoparticles are between approximately 0.1 percent and 1.0 percent of the weight of the nanocomposite.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
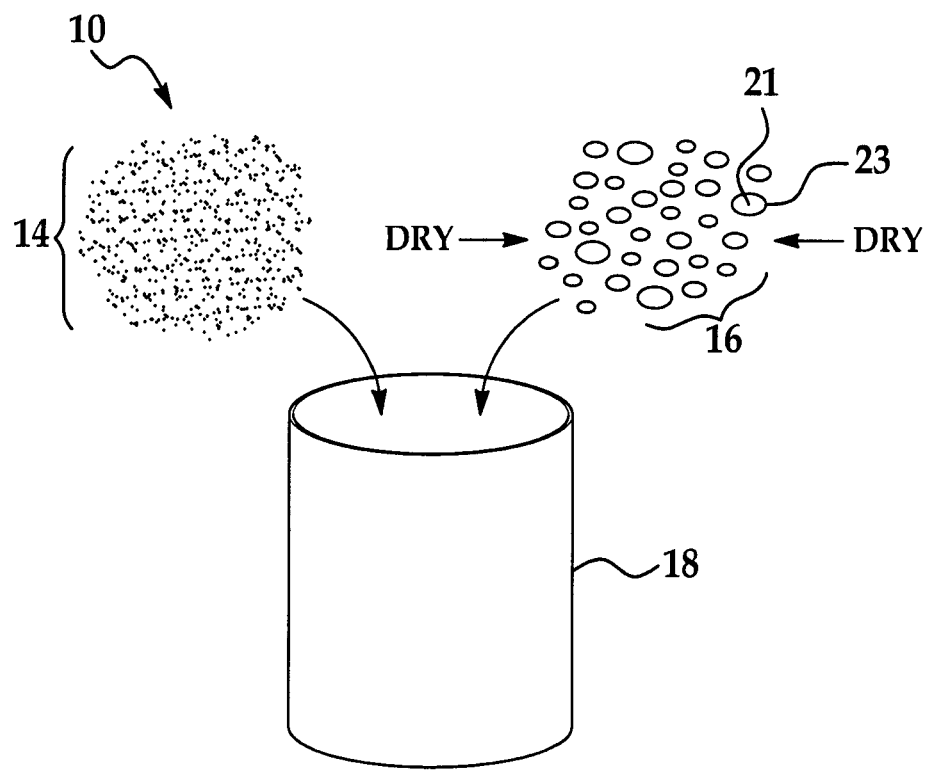
FIG. 1 is a schematic illustration of a nanocomposite manufacturing method of the present disclosure.

The following description is merely exemplary in nature and is not intended to limit the present disclosure, application, or uses. It should be understood that throughout the drawings, corresponding reference numerals indicate like or corresponding parts and features.

Figure 2:
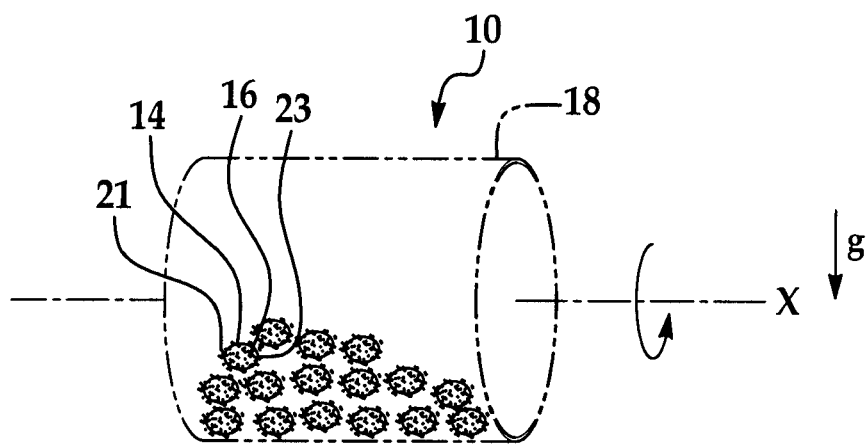
FIG. 2 is a schematic illustration of the nanocomposite manufacturing method of FIG. 1.
Figure 3:
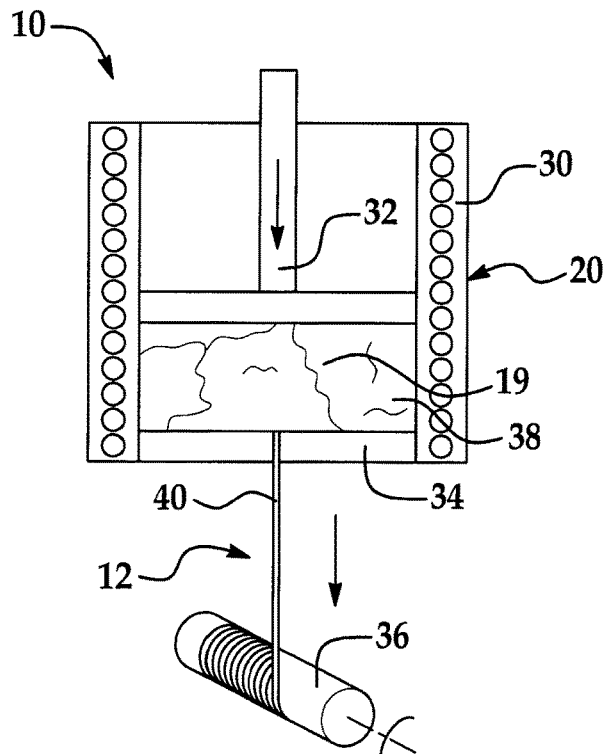
FIG. 3 is a schematic illustration of the nanocomposite manufacturing method of FIGS. 1 and 2.
Figure 9:
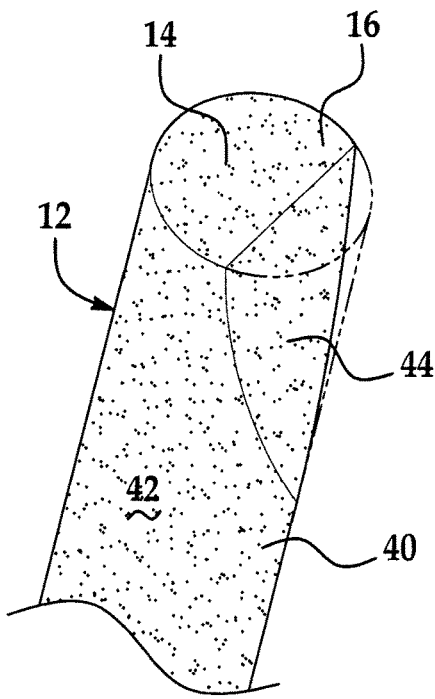
FIG. 9 is a fiber of nanocomposite material manufactured according to the method of FIGS. 1-3.

Referring to FIGS. 1-3 and 9, a manufacturing method 10 is shown for the manufacture of a nanocomposite 12 (FIGS. 3 and 9). As will be discussed, the method 10 can enhance dispersion of nanoparticles 14 throughout a matrix material 16 such that the resultant nanocomposite 12 can have substantially desirable properties (e.g., high mechanical strength, thermal stability, etc.) using relatively low concentrations of nanoparticles 14.

As shown in FIGS. 1 and 2, the method 10 can begin by exposing a known quantity of nanoparticles 14 to a known quantity of the matrix material 16. In some embodiments, the nanoparticles 14 and the matrix material 16 can be introduced into a container 18 to form a combination 19 (FIG. 2) of the two materials. The container 18 can be of any suitable type, such as a glass, metal, or plastic container 18.

The matrix material 16 can be a solid and pelletized material, and each pellet 21 can measure several millimeters in width. Each pellet 21 of the matrix material 16 can include a respective outer surface 23. The pellets 21 of the matrix material 16 can have any suitable shape, such as circular or ovate balls. Also, the matrix material 16 can include a polymeric material (e.g., crystalline, semicrystalline, glassy, elastomeric, etc.). In some embodiments, the matrix material 16 can include polypropylene, polystyrene, polycarbonate, polymethylmethacrylate and/or polyethylene. However, it will be appreciated that the matrix material 16 can be of any suitable type without departing from the scope of the present disclosure. Furthermore, the matrix material 16 can be dried prior to being combined with the nanoparticles 14 as represented by the word "DRY" in FIG. 1. For instance, the matrix material 16 can be dried at approximately 125° F. for approximately 24 hours to remove moisture from the matrix material 16.

Moreover, the nanoparticles 14 can be of any suitable type, such as carbon black, montmorillinite clay, carbon nanotubes, graphite, and/or fumed silica. Also, the nanoparticles 14 can be nanometallic particles. Also, in one embodiment, the nanoparticles 14 can have at least one dimension (e.g., width dimension) measuring 100 nanometers or less (e.g., between approximately 2 and 100 nanometers). It will be understood that the nanoparticles 14 can be dry as well (e.g., not suspended in a solvent or other similar material).

Then, as shown in FIG. 2, the combination 19 can be agitated to thereby disperse the nanoparticles 14 substantially evenly on the respective outer surfaces 23 of the matrix material 16. For instance, the container 18 can be rotated about a single axis, X, wherein the axis is transverse (e.g., perpendicular) to a direction of gravity (shown as g in FIG. 2). As such, the pellets 21 of matrix material 16 can tumble over each other, and this tumbling action can cause the nanoparticles 14 to substantially evenly coat the outer surfaces 23 of the matrix material 16. In some embodiments, grinding objects, such as small metal or glass spheres (not shown) can be included in the container 18 with the combination 19, and the grinding objects can abrade the outer surfaces 23 and help to coat the outer surfaces 23 of the matrix material 16. However, it will be appreciated that the combination 19 can be agitated in any suitable fashion other than tumbling. For instance, the combination 19 can be shaken primarily in the vertical direction on a vibrating platform or table (e.g., at about 10 to 20 cycles per second). Also, in some embodiments, multiple containers 18, each containing a respective combination 19 can be agitated simultaneously.

Additionally, agitating the combination 19 can be performed in a room temperature environment (e.g., 60° F. to 85° F.). Accordingly, the matrix material 16 can remain in a solid state while it is agitated. As such, agitation can be completed in a relatively uncomplicated manner and at relatively low cost.

The container 18 can be agitated for any suitable amount of time. In some embodiments, the container 18 can be agitated for six hours to fourteen days. Also, in some embodiments, the container 18 can be agitated for approximately twenty-four hours. It will be appreciated that the agitating time can be varied according to the affinity of the nanoparticles 14 to evenly coat the outer surfaces 23 of the matrix material 16 and/or according to the tendency of the nanoparticles 14 to conglomerate (i.e., stick) together. For instance, a combination 19 may need to be agitated for a longer amount of time if the nanoparticles 14 have a low affinity for dispersing evenly on the matrix material 16 and/or have a low tendency to conglomerate. On the other hand, a combination 19 may need to be agitated for a shorter amount of time if the nanoparticles 14 have a higher affinity for dispersing evenly on the matrix material 16 and/or have a high tendency to conglomerate.

Also, the nanoparticles 14 in the combination 19 can be included at any suitable amount. In some embodiments, the nanoparticles 14 can be at most 1% of the total weight of the combination 19. Also, in some embodiments, the nanoparticles 14 can be between approximately 0.1% and 1.0% of the total weight of the combination 19. In still other embodiments, the nanoparticles 14 can be between approximately 0.1% and 0.5% of the total weight of the combination 19. It will be appreciated that the amount of nanoparticles 14 can be chosen such that there are little or no residual (i.e., loose) nanoparticles 14 after agitating the combination 19. The amount can also be chosen according to the affinity of the nanoparticles 14 to evenly distribute on the matrix material 16 and/or according to the tendency of the nanoparticles 14 to conglomerate (i.e., stick) together. For instance, a lower weight percentage of nanoparticles 14 can be used if the nanoparticles 14 have a low affinity for dispersing evenly on the matrix material 16 and/or have a high tendency to conglomerate. Also, a higher weight percentage of nanoparticles 14 can be used if the nanoparticles 14 have a high affinity for dispersing evenly on the matrix material 16 and/or have a low tendency to conglomerate. Additionally, the amount of nanoparticles 14 can be chosen according to the size of the pellets of matrix material 16. In addition, the amount of nanoparticles 14 can be chosen according to the total exposed surface area of the matrix material 16 to achieve a predetermined surface to volume ratio of the combination 19. It will be appreciated that the amount of nanoparticles 14 can be chosen so as to completely coat the pellets of matrix material 16, or the amount of nanoparticles 14 can be chosen so as to less than completely coat the pellets of matrix material 16. In addition, the amount of nanoparticles 14 can be chosen according to the properties that are desired of the nanocomposite 12 produced from the combination 19 as will be discussed in greater detail below.

Agitating the combination 19 can cause the matrix material 16 to build a surface static electric charge due to rubbing/abrasion between the individual pellets of the matrix material 16 and between the matrix material 16 and the nanoparticles 14. The nanoparticles 14 adjacent to the surfaces of the matrix material 16 can be more strongly adhered to those surfaces, and other nanoparticles 14 further spaced from the matrix material 16 can be more easily transferred to other free surfaces of the matrix material 16. Accordingly, the nanoparticles 14 can be more evenly dispersed on the matrix material 16.

Agitating the combination 19 can also cause abrasion of the matrix material 16 to thereby create free radicals on the surfaces of the matrix material 16. As such, the bonding of the nanoparticles 14 on the matrix material 16 can be enhanced.

As shown in FIG. 3, the combination 19 can be processed using a processor 20 to form the nanocomposite 12. The processor 20 can be of any suitable type, such as an extruding machine, a drawing machine, a heater, an injection molding machine, and a calendaring machine.

In some embodiments, the processor 20 can include a heated container 30, a plunger 32, a die 34, and a spool 36. The combination 19 can be placed within a cavity 38 inside the container 30, and the container 30 (e.g., a barrel of a capillary rheometer) can heat the combination 19 to any suitable temperature above the melting temperature of the matrix material 16 (e.g., approximately 170° C.) in order to bring the matrix material 16 to a viscous or molten state. It will be appreciated that the nanoparticles 14 can further disperse through the matrix material 16 when the matrix material 16 is in the viscous state.

The plunger 32 can be actuated within the container 30 in order to extrude a continuous fiber 40 of the nanocomposite 12 through the die 34. As it exits the container 30, the fiber 40 can be cooled and spooled onto the spool 36 in order to collect the nanocomposite 12. Also, the rate of spooling on the spool 36 can be controlled in order to control the physical dimensions (e.g., the diameter) of the fiber 40.

As shown in FIG. 9, the fiber 40 of the nanocomposite 12 can include an outer surface 42 and an inner portion 44. As shown, the nanoparticles 14 can be dispersed substantially evenly on the outer surface 42, and the nanoparticles 14 can also be embedded within and substantially evenly dispersed in the inner portion 44 of the fiber 40.

However, it will be appreciated that the combination 19 can be processed by the processor 20 in any suitable manner. For instance, the combination 19 can be subjected to extruding, injection molding, calendaring, and/or drawing processes. Also, the nanocomposite 12 can be formed without making the combination 19 viscous. Moreover, other the nanocomposite 12 can be processed into any suitable article, such as a fiber, sheet, film, ribbon or any other suitable article.

Thus, it will be appreciated that the method 10 allows for substantially even dispersion of the nanoparticles 14 in the nanocomposite 12. However, manufacturing the nanocomposite 12 can be relatively uncomplicated and relatively inexpensive.

The properties (e.g., yield strength, ultimate tensile strength, etc.) of the nanocomposite 12 can be significantly enhanced as will be discussed in greater detail below. These properties can be further enhanced if the nanocomposite 12 is highly drawn or oriented in a predetermined direction during processing. For instance, in one embodiment, the strength of the nanocomposite 12 can be improved by 300% to 1500%.

It will be appreciated that these results can be obtained using a relatively low concentration of nanoparticles 14. It will also be appreciated that the type, size, shape, etc. of the matrix material 16 can affect the nanocomposite 12. For instance, for a given weight, smaller pellets of matrix material 16 will have an increased amount of available surface area for receiving the nanoparticles 14, and the concentration of nanoparticles 14 can be selected according to the known amount of surface area of the outer surfaces 21 of the matrix material 16.

Furthermore, it will be appreciated that the method 10 allows for nanocomposite manufacture without complex or costly modification to common processing equipment. Rather, the method 10 can be accomplished with readily available machinery. Also, the method 10 can be completed in a relatively short amount of time. Thus, the method 10 can be more easily employed in large-scale, high-yield manufacturing operations.

Figure 4:
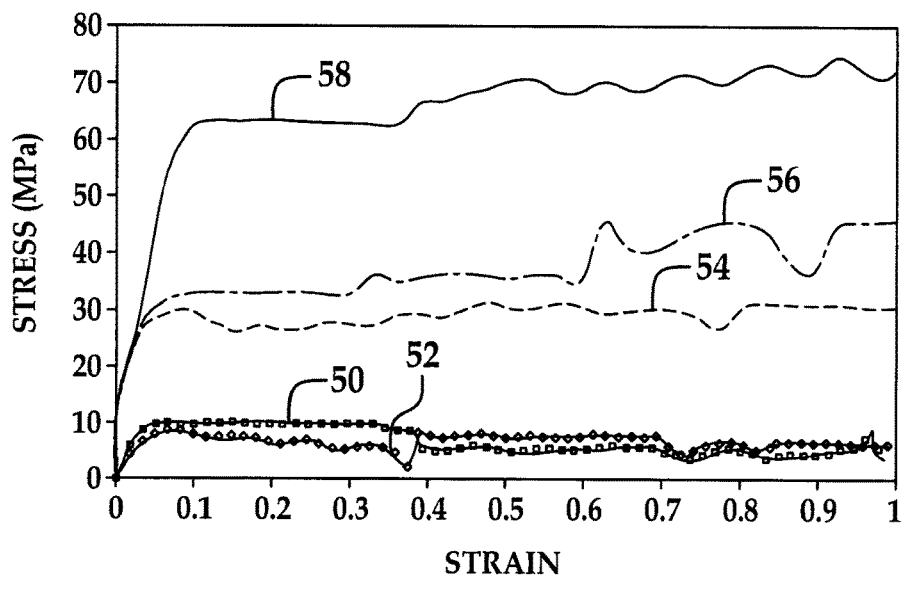
FIGS. 4 and 5 are graphs showing mechanical stress versus strain characteristics of various materials, including nanocomposites manufactured according to the method of FIGS. 1-3.

Referring to the graph of FIG. 4, mechanical properties (i.e., tensile stress versus strain) are illustrated for various materials including exemplary embodiments of the nanocomposites 12 manufactured via the method 10. Specifically, in the embodiments of FIG. 4, properties of a fiber of relatively pure polypropylene_70 (without any nanoparticles 14) are shown according to line 50. Properties of pure polypropylene_90 is shown according to line 52. However, properties of fibers 40 of nanocomposites 12 formed according to the method discussed above are shown according to lines 54, 56, and 58. Line 54 represents a 100 μm diameter fiber with 0.1 weight percentage of carbon black. Line 56 represents a 50 μm diameter fiber with 0.1 weight percentage of carbon black. Line 58 represents a 30 μm diameter fiber with 0.1 weight percentage of carbon black. Each fiber represented in FIG. 4 can have an initial fiber gauge length of about 20 mm, and the extension rate can be about 0.1 mm/s.

Figure 5:
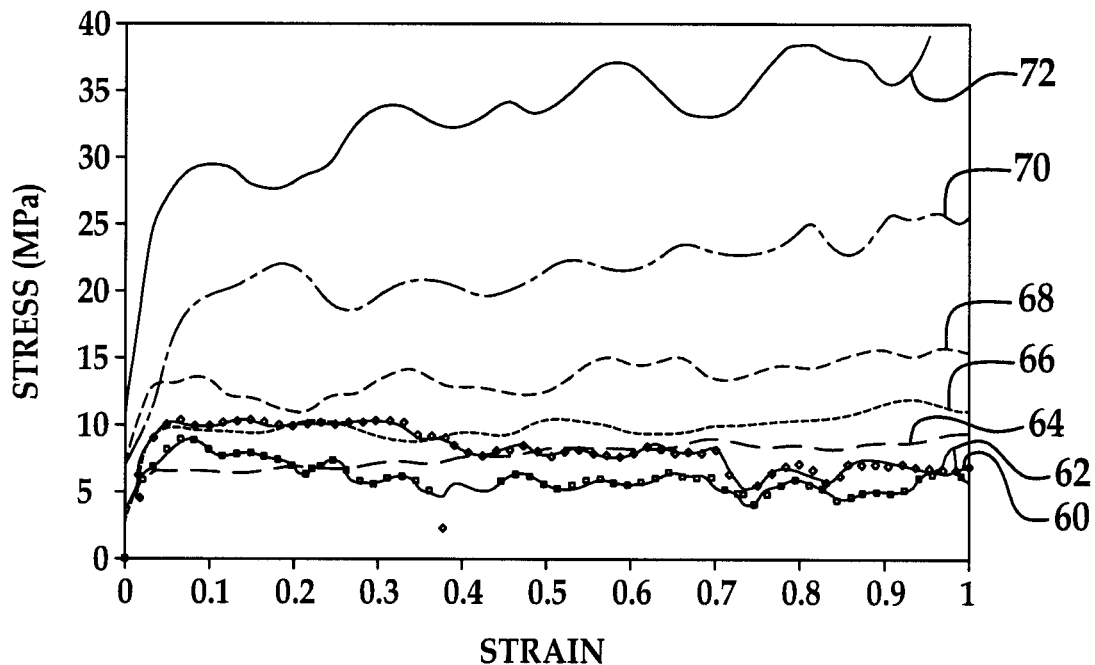

Furthermore, referring to the graph of FIG. 5, mechanical properties of a fiber of relatively pure polypropylene_70 (without any nanoparticles 14) are shown according to line 60, and properties of pure polypropylene_90 is shown according to line 62. However, properties of fibers 40 of nanocomposites 12 formed according to the method discussed above are shown according to lines 64, 66, 68, 70, and 72. Line 64 represents a 100 μm diameter fiber with 0.5 weight percentage of carbon black. Line 66 represents a 70 μm diameter fiber with 0.5 weight percentage of carbon black. Line 68 represents a 50 μm diameter fiber with 0.5 weight percentage of carbon black. Line 70 represents a 40 μm diameter fiber with 0.5 weight percentage of carbon black. Line 72 represents a 30 μm diameter fiber with 0.5 weight percentage of carbon black. Each fiber represented in FIG. 5 can have an initial fiber gauge length of about 20 mm, and the extension rate can be about 0.1 mm/s.

Figure 6:
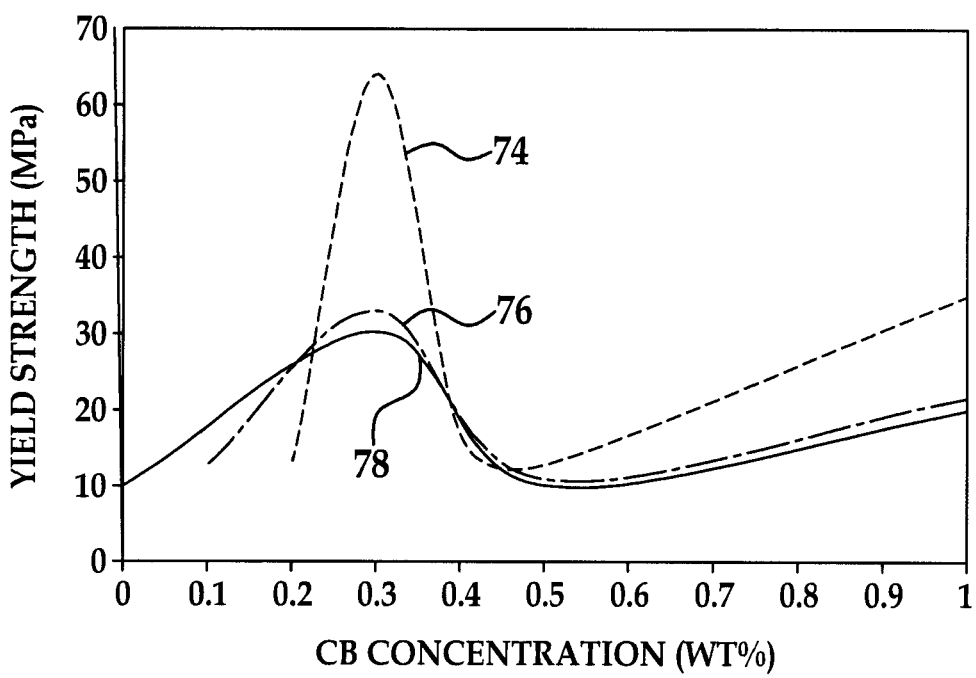
FIG. 6 is a graph showing yield strength versus nanoparticle concentration for nanocomposites manufactured according to the method of FIGS. 1-3.

FIG. 6 illustrates yield strength data for various exemplary embodiments of the nanocomposites 12. For instance, line 74 represents the yield strength of 50 μm diameter fibers versus the weight percentage of carbon black nanoparticles 14 therein. Line 76 represents the same data for 60 μm diameter fibers, and line 78 represents the same data for 70 μm diameter fibers.

Figure 7:
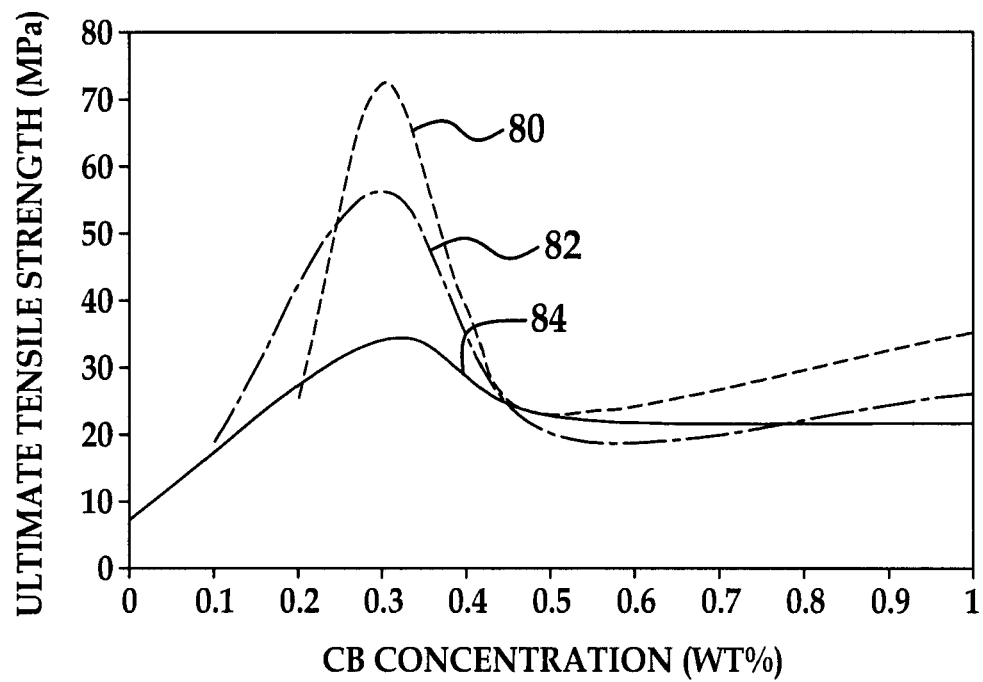
FIG. 7 is a graph showing ultimate tensile strength versus nanoparticle concentration for nanocomposites manufactured according to the method of FIGS. 1-3.

Furthermore, FIG. 7 illustrates ultimate tensile strength data for various exemplary embodiments of the nanocomposites 12. For instance, line 80 represents the ultimate tensile strength of 50 μm diameter fibers versus the weight percentage of carbon black nanoparticles 14 therein. Line 82 represents the same data for 60 μm diameter fibers, and line 84 represents the same data for 70 μm diameter fibers.

Figure 8:
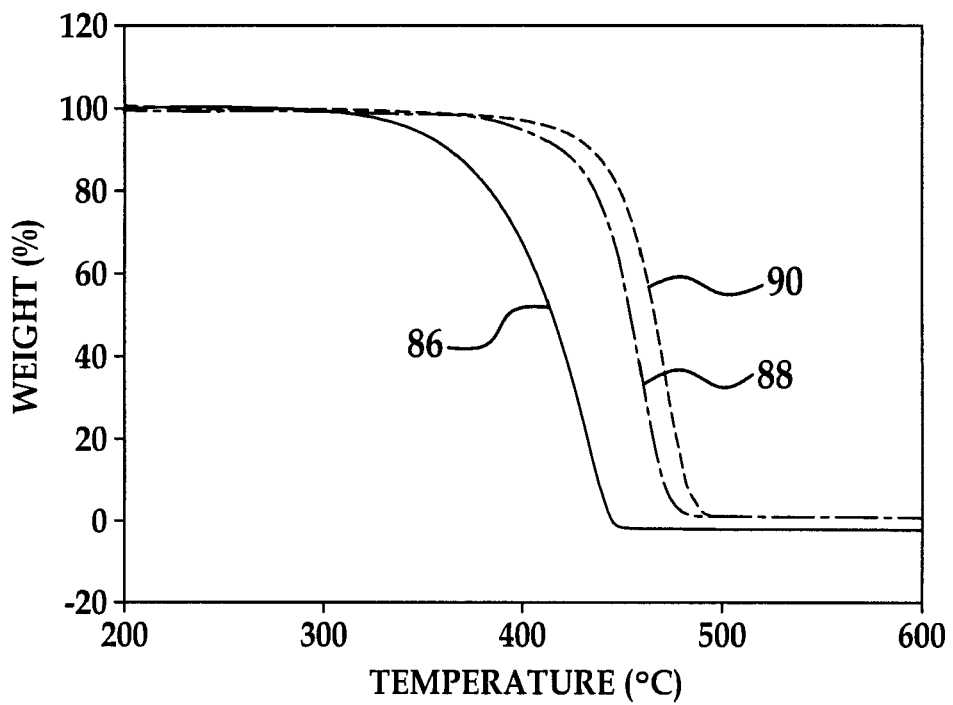
FIG. 8 is a graph showing thermal characteristics of various materials, including nanocomposites manufactured according to the method of FIGS. 1-3.

Moreover, FIG. 8 illustrates thermal stability data for various exemplary embodiments of the nanocomposite 12. Line 86 represents the thermal stability of relatively pure polypropylene (without nanoparticles 14), line 88 represents thermal stability of the nanocomposite 12 with about 1.0 weight percentage of carbon black nanoparticles 14, and line 90 represents thermal stability of the nanocomposite 12 with about 0.5 weight percentage of carbon black nanoparticles 14. In each of the materials of FIG. 8, approximately 10 mg of the respective materials can be heated at a rate of about 10° C./min.

Accordingly, as shown in FIGS. 4-8, the method 10 discussed above can be used to produce nanocomposites 12 with relatively high strength as compared to the matrix material 16 without the nanoparticles 14. Furthermore, the nanocomposite 12 can have high thermal stability as compared to the matrix material 16 without the nanoparticles 14. It will be appreciated that other properties (e.g., electrical properties, acoustic properties, etc.) can be enhanced as well.

Thus, the nanocomposite 12 formed according to the method 10 discussed above can be employed in various ways. For instance, the nanocomposite 12 can be employed in weight bearing articles due to its high strength. Also, the nanocomposite 12 can be used in a high-strength fiber-reinforced composite material. Furthermore, the nanocomposite 12 can be tailored to have enhanced electrical properties and can be used as a conductive polymer, as an anti-static film, etc.

In summary, the method 10 discussed above can be used for producing nanocomposites 12 relatively easily and at relatively low cost with conventional equipment. Also, solvents and other materials are unnecessary using this method 10. The method 10 can be scaled to produce relatively low amounts of nanocomposites 12 or to produce relatively large amounts of nanocomposites 12. The method 10 can be used in association with a wide variety of nanoparticles 14 as well as a wide variety of matrix materials 16. Furthermore, the method 10 can be adapted according to the matrix material 16 and/or the nanoparticles 14 that is used. The method 10 can be further adapted according to the desired properties of the resultant nanocomposite 12. Moreover, the matrix material 16 can be enhanced with the addition of relatively low concentrations of nanoparticles 14.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, steps, elements and/or functions between various embodiments is expressly contemplated herein so that one of ordinary skill in the art would appreciate from this disclosure that features, steps, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A method of manufacturing a nanocomposite comprising:
    drying a plurality of solid pellets at approximately 125° F. for approximately 24 hours to generate dry solid pellets, wherein the pellets are polypropylene pellets;
    exposing a plurality of dry nanoparticles of carbon black to the plurality of dry pellets in a container to form a combination of the nanoparticles and the pellets, the nanoparticles each having at least one dimension that is at most 100 nanometers, the pellets each being individually millimeters in width, and wherein the nanoparticles are at most 1% of the total weight of the combination;
    rotating the container including the combination for approximately 24 hours at room temperature about an axis that is transverse to a direction of gravity to cause a tumbling action between the pellets and nanoparticles to thereby evenly disperse and coat the nanoparticles evenly and directly on outer surfaces of the pellets, the pellets remaining in a solid phase and remaining the same size throughout an entire duration of the rotating of the combination, wherein grinding objects are not included in the container during the rotating; and
    heating the combination to form a viscous combination having the nanoparticles dispersed in the polypropylene pellets that is viscous; and
    drawing the viscous combination to form a nanocomposite fiber having the nanoparticles dispersed evenly throughout the fiber, wherein the nanocomposite fiber has a diameter of from 30 µm to 100 µm and a tensile strength that is from 300% to 1500% greater than a tensile strength of a similar fiber created by the same method and with the same polypropylene pellets, but without nanoparticles.

2. The method of claim 1, further comprising choosing an amount of the nanoparticles to be exposed to the pellets according to an affinity of the nanoparticles to disperse evenly on the pellets due to the rotating of the combination.

3. The method of claim 1, further comprising choosing an amount of the nanoparticles to be exposed to the pellets according to a total outer surface area of the pellets to achieve a predetermined surface to volume ratio of the combination.

4. The method of claim 1, further comprising choosing an amount of time for rotating the combination according to an affinity of the nanoparticles to disperse evenly on the pellets due to the rotating of the combination.

* * * * *